Aug. 3, 1943.    S. S. MATTHES    2,325,788
TROLLEY WIRE SUPPORT
Filed Jan. 16, 1940    3 Sheets-Sheet 1
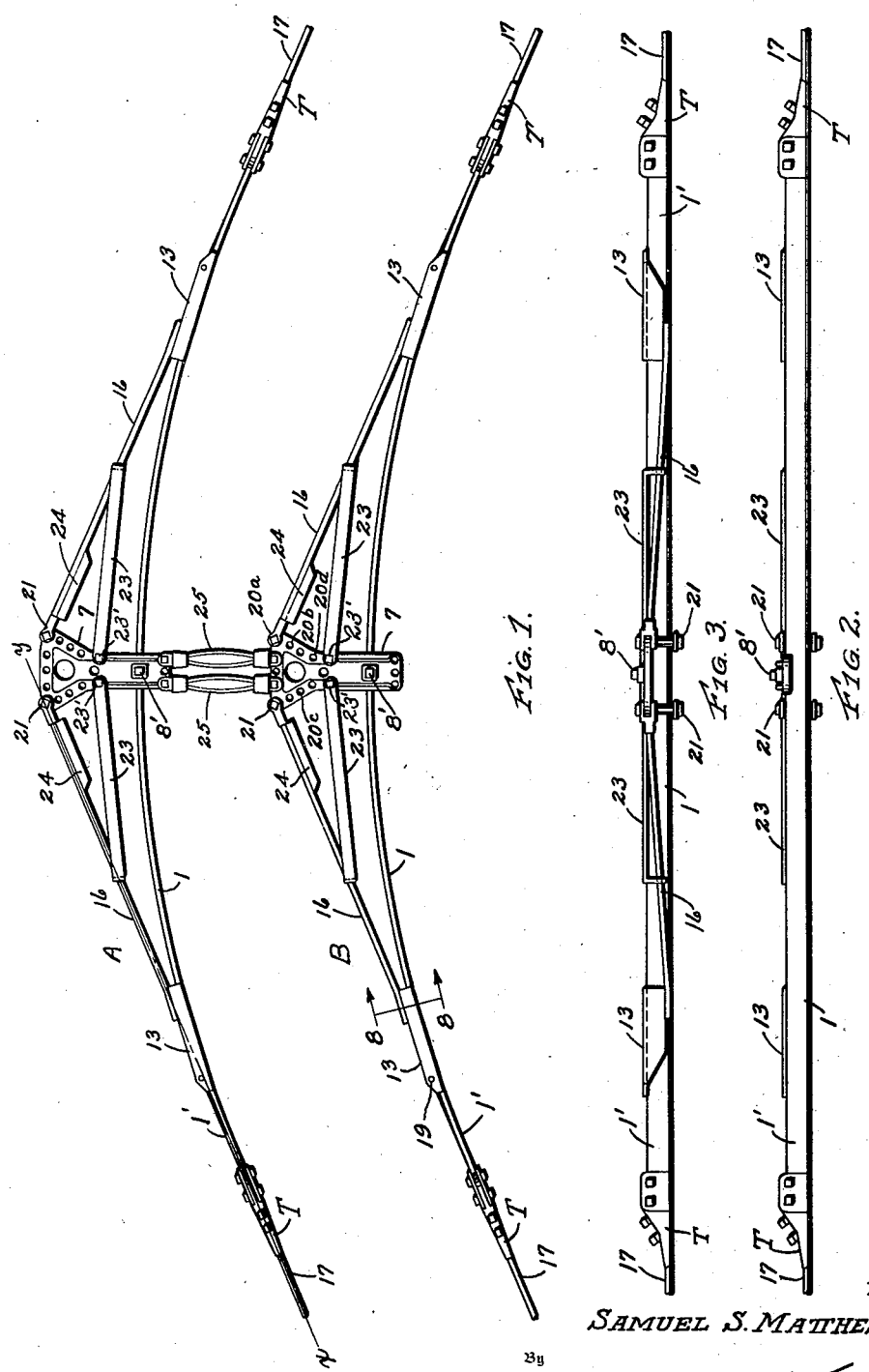
Inventor
SAMUEL S. MATTHES
By
Attorney Aug. 3, 1943. S. S. MATTHES 2,325,788
TROLLEY WIRE SUPPORT
Filed Jan. 16, 1940 3 Sheets-Sheet 2

Inventor
SAMUEL S. MATTHES
By
Attorney

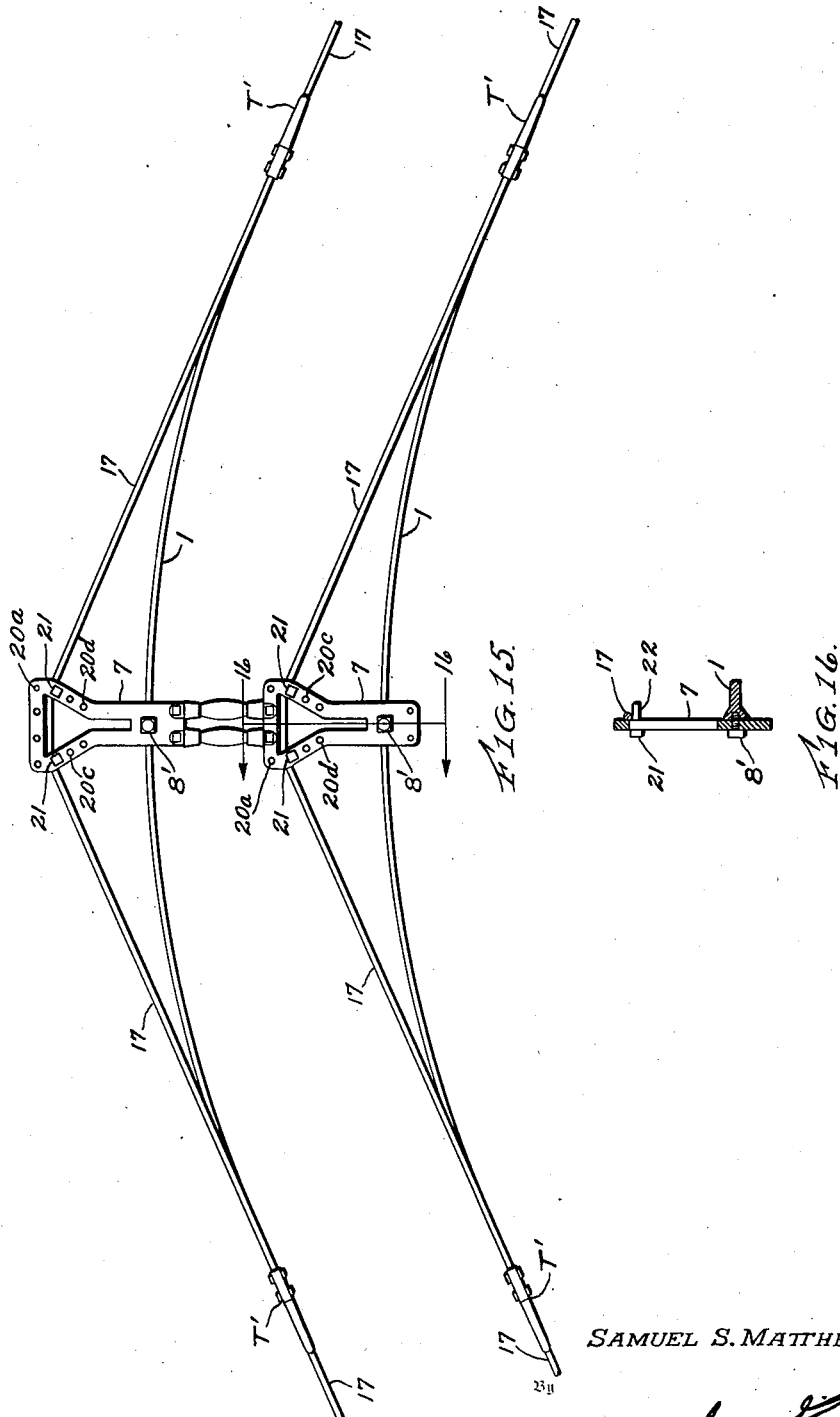

Patented Aug. 3, 1943

2,325,788

UNITED STATES PATENT OFFICE 2,325,788

TROLLEY WIRE SUPPORT

Samuel S. Matthes, Mansfield, Ohio, assignor to The Ohio Brass Company, Mansfield, Ohio, a corporation of New Jersey Application January 16, 1940, Serial No. 314,117

24 Claims. (Cl. 191—40)

My invention relates to a support for trolley wires in overhead trolley construction, principally for trolley bus operation. In trolley bus operation two parallel trolley wires of opposite polarity are made use of.

One object of my invention is to provide means for supporting the trolley wire and avoiding a multiplicity of supports and cross wires.

Another object of my invention is to provide a support for trolley wires on curves in which the support is adjustable to meet various degrees of curvature of the trolley wire.

Another object of my invention is to provide means which will support the severed ends of a trolley wire on a curve.

Still another object of my invention is to provide means which will support the trolley wire without severing its continuity either permanently or temporarily.

Other objects will be obvious to those skilled in the art as I proceed with the disclosure of my invention.

My invention resides in the new and novel construction, combination and relation of the parts hereinafter described and shown in the drawings accompanying this specification.

In the drawings—

Fig. 1 is a top plan view of my invention arranged for two trolley wires.

Fig. 2 is a back view in elevation of my invention shown in Fig. 1.

Fig. 3 is a front view in elevation of my invention.

Fig. 15 is a top plan view of a modification of my invention.

Fig. 16 is a partial section on the line 16—16 of Fig. 15.

In the preferred embodiment of my invention, I employ a bar 1, preferably rectangular in cross section and of such dimensions as to meet requirements in some cases being approximately ⅜" x 1⅜" x 10'. The lower edge is adapted to guide a current collector across the device. In previous devices the bar corresponding to my present element 1 has been made of angle, channel or T bar to give it rigidity after being formed to shape by machinery. In my present construction the bar 1 must be bendable in the hands of workmen in the direction of curvature in order to adjust it to meet various degrees of curvature either during or after installation.

Figure 11:
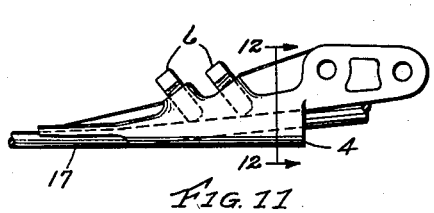
Fig. 11 is a side view of a tip for use when the trolley wire is continuous through the support.
Figure 10:
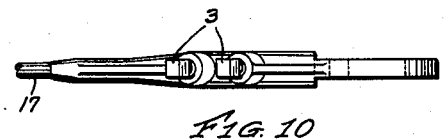
Fig. 10 is a top view of Fig. 9.
Figure 9:
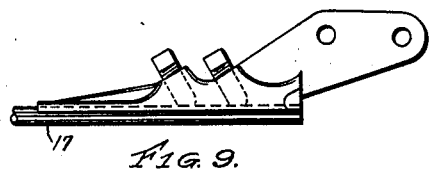
Fig. 9 is a side view of an end tip to which the end of the severed trolley wire may be secured.

Each end of the bar 1 is provided with a clevis with registering transverse openings. Also each end of the bar 1 is provided with trolley wire tips T to receive and hold the trolley wire in predetermined relation to the bar. The tips are provided with transverse openings registering with the previously mentioned openings to receive securing means such as bolts or screws. The tip shown in Fig. 9 requires the trolley wire to be severed and the end slid into the groove in the tip and held by the set screw 3, and the tip shown in Fig. 11 is arranged to receive and hold the trolley wire when it is continuous through the support as shown in Fig. 15 and is provided with lips 4 shown in Fig. 12 to clinch around the wire after being placed in the groove 5. The set screws 6 may be used, if desired, to aid in preventing longitudinal shifting of the wire relative to the support.

Figures 5, 7:
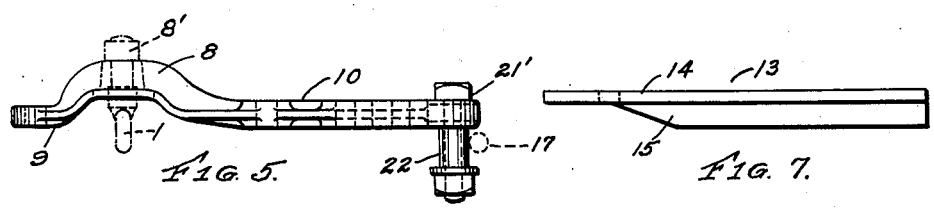
Fig. 5 is a side view of the strain plate shown in Fig. 4 and also shows in dotted lines its manner of attachment to the curved bar which I employ.
Fig. 7 is a side view of Fig. 6.
Figure 6:
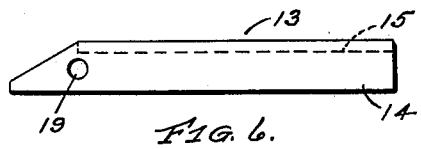
Fig. 6 is a top view of an angle attachment which I employ and later describe.

Attached to the bar 1 intermediate its ends is the strain plate 7, and the manner of detachably securing the parts together is shown in Fig. 5 in which the threaded stud 8', welded to the upper portion of the bar, projects through an opening in the plate 7 and is secured by a nut.

The strain plate 7 is an elongated body of metal with a transverse recess portion 8 and drop arms 9 and 10 projecting therefrom. This construction brings the strain and supporting wires (not shown), which may be secured in the openings 11 and 12, in horizontal alignment or substantially so with the trolley wire and lower edge of the bar 1.

Figure 4:
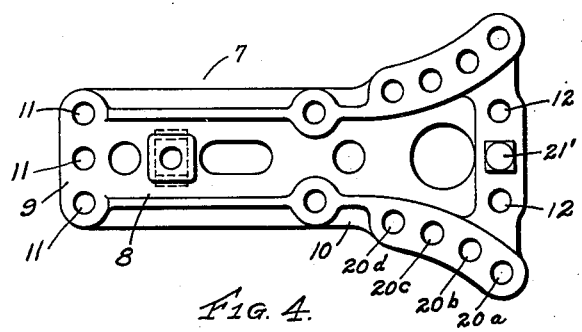
Fig. 4 is an enlarged top view of the strain plate shown in Fig. 1.
Figure 8:
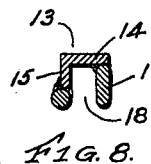
Fig. 8 is a section of Fig. 1 on the line 8—8.

Attached to the bar 1 adjacent each end by welding or otherwise and shown in Figs. 1, 2 and 8, is an angle attachment 13. This attachment is shown as an elongated bar 1 formed from a rolled metal section and having one leg 14 welded to the upper edge of the bar and the other leg 15 parallel or angularly disposed to and spaced from the bar. The attachment 13 is spaced from the end of the bar 1, thus the end portions 1' of the bar are free to adjust themselves to variations which may occur in the installation of the device or shifting of the overhead construction from time to time. The attachment 13 may be as much as 12 inches long and tends to stiffen the bar 1 at the place of attachment.

The angle attachment 13 provides a convenient and practical means for attaching the tension rods 16 to the bar 1 as shown in Fig. 8. These rods have one end welded to the lower edge of the leg 15 and in substantially the same horizontal plane with the lower edge of the bar 1 and in substantial longitudinal alignment with the trolley wires 17, see Fig. 3; the angle attachment also spaces the tension rod from the bar 1 and provides the channel 18 through which one flange of the current collector passes as it moves across the bar 1 without interference. Further, the flange 15 tends to prevent dewirement of the current collector as the collector swings onto the bar 1 from the trolley wire.

The hole 19 in the angle attachment provides a convenient means for attaching a block and tackle to the device during installation of the same. The ends of the legs 14 and 15 may be beveled, if desired, to offer less obstruction to a flying trolley pole. The angle attachments may be made relatively short in length, from one to three inches, and attached to the bar 1, at or adjacent the ends of the bar 1, as conditions will permit, but I prefer to place the attachments 13 back from the ends of the bar as previously described, see Fig. 3.

The tension rods 16 have one end fixed relative to the bar 1 and are of fixed length, therefore to vary the curvature of the bar 1, I provide a plurality of holes 20a, 20b, 20c and 20d in the strain plate 7 to receive attaching means at the free ends of the rods 16, such means is shown as a clevis which may be welded or threaded on the end of each rod and a bolt 21 positioned in one of the said holes. The holes 20a to 20d inclusive are so located that when the bar 1, which is fixed at the stud 8', is bent to the desired curvature the clevis bolt 21 will register with one of the said holes. In one actual construction the range of adjustability, using a bar of fixed length of approximately 9½ feet, is 12 to 18 feet radius of curvature of the bar and the length of the circle covered by the bar varying between 45° and 30° respectively by 5° steps.

Figure 14:
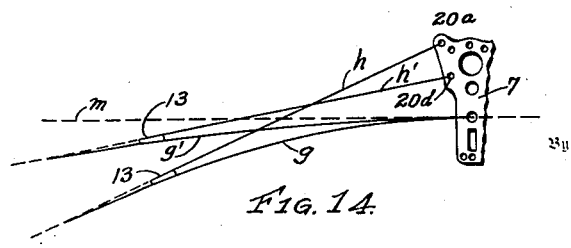
Fig. 14 shows diagrammatically the method I employ in the adjustable feature of my invention.

My invention is expressed diagrammatically in Fig. 14 in which g represents the bar bent to its shortest radius of curvature for which the device is suitable and the tension rod h is shown as anchored to the plate 13 and in the hole 20a in plate 7. If now the bar is adjusted to a larger radius of curvature, as for instance, the maximum radius of curvature for which the device is adapted, as shown by line g', then the tension rod will take the position shown by the line h' with its free end anchored in the opening 20d. The line M represents the bar 1 if it were tangent or parallel to a straight trolley wire, in which case no tension rod would be required, in fact the device itself is not needed. Note that the axes of the tension rods h and h' are tangent with the free ends of the bar and axis of the trolley wire. Note also in Fig. 1 that the extended axis of the rod 16 is tangent to the axis of the trolley wire as shown by the dotted line x—y.

Mounted upon the plate 7 is a stud 21' which is provided with a spacing sleeve 22 and against which the trolley wire may rest either permanently or temporarily during installation of the device. In the former case the rods 16 and members 13 would not be required, as the trolley wire would act as a substitute therefor, and in the latter case after the device is positioned the trolley wire would be parted, the length of the free ends adjusted and the free ends positioned in the longitudinal grooves of the tips shown in Fig. 9 and anchored therein.

If desired, the studs 21 which secure the free ends of the rod 16 in position may be fitted with sleeves 22, and the stud 21' and its sleeve omitted, thus providing two points of support for the trolley wire at the end of the plate 7 as shown in Figs. 15 and 16. These studs 21 may be positioned in different openings 20a, etc. to adjustably secure the trolley wire to the plate 7 whereby the predetermined angular spread of the trolley wire may be secured.

Figure 13:
Fig. 13 shows a modification of Fig. 8 and is used when the trolley wire is to be continuous through the support.

If the device is used with a continuous trolley wire, the tip T' shown in Fig. 11 or other suitable fastening means will be employed and the trolley wire may be lead along the convex face of the bar 1 and in such case the angle attachment 13 would be modified sufficiently to allow the wire 17 to rest in the upper corner of the channel 18' as shown in Fig. 13 and out of danger of being engaged by the current collector.

Before installation, the free ends of the rods 16 are positioned in the proper hole 20a to 20d to meet the required curvature of the bar 1.

The device is usually installed by first properly positioning the device, employing strain wires anchored in the holes 11 and 12 and to side poles. If the trolley wire is to be severed and its ends secured in terminal tips, Fig. 9, the wire in a continuous condition is temporarily held in place by being laid along the studs 21—22 or the stud 21'—22'.

Blocks and tackle are then secured in the holes 19 and to the trolley wire at a distance from each end of the device to hold the trolley wires and device in fixed but temporary relation. The trolley wire is then cut as required and the ends positioned in the tips and anchored therein and the block and tackle removed.

Figure 12:
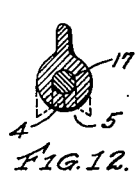
Fig. 12 is a view in section on the line 12—12 of Fig. 11.

If the trolley wire is to be permanently continuous, it is laid in the grooves 18' and also the groove 5 in each tip, Fig. 12, and the tips 4 peened into position and the screws 6 will then be set to anchor the trolley wire in place against longitudinal movement relative to the support. If desired the continuous trolley wire may be carried back of the studs 21—21 in which case it will approximate a parallel relation with the rods 16.

In order to prevent a flying trolley pole head from becoming caught in the triangle opening formed between the bar 1, the plate 9, and the rod 16, I employ the bars 23 which may be flat and bent at one end at right angles and the bent end provided with a hole to slidably receive the rod 16. The other end of each bar 23 is attached to the plate 7 by bolts 23' or by other means which will permit the bars to swivel when the curvature of the bar 1 is changed as previously described. The bar 23 may be of any width necessary to give proper protection or two or more bars 23 may be used at each opening. The laterally projecting longitudinal plates 24 which are welded to the rods 16 also help to reduce the opening and thus prevent the trolley pole head fouling with the device.

The above description has been confined to a single device A. However, for trolley bus operation two supports or devices A and B are required as shown in Fig. 1 and in this case the strain plates 7 are connected by insulating members 25 which may be secured to the plates by means of bolts in the holes 11 and 12 respectively of the plates 7, thus holding the device in predetermined separation and insulated relation.

From my description it will be evident that with a device as described having a deformable bar 1 of fixed length and a tension rod 16 of fixed length and with one end of each rod attached to the bar as described and the other end to the strain plate 7 to which the bar 1 is also attached, and with means 20 on the plate to receive the free ends of the rod, that with proper location of the said means 20 the curvature of the bar may be changed (radius of curvature increased or decreased) and simultaneously the length of that portion of the circumference or arc of the circle which the bar covers will be changed, that is, when the radius or curvature of the bar 1 is increased the portion of the circle or arc thereof covered by the bar is decreased and vice versa. The portion of the circle covered by the bar for various curvatures is expressed in degrees.

In the actual construction previously referred to, the curvature may be so changed that the bar will cover an arc of a circle of 30° which would be proper for use in supporting a trolley wire on a curve at three points, as three devices of 30° would equal 90° which would be the length of the curve at a street corner of 90°; also with another adjustment of the device the bar may be made to cover 45° or ⅛ of a circle in which case two devices would be used on a 90° curve as at a right angle street corner. The bars, of course, would not extend entirely around a curve but the trolley wire connecting the device would be substantially straight and tangent with the ends of the bar.

In the case of the 30° bar just referred to, the radius of curvature would be greater than that in the case of the 45° bar and the speed of the bus rounding the curve supported by the 30° device could be greater than at a curve using the 45° bar, with less danger of dewirement as the curve formed by the three 30° devices would be more gradual.

The stud securing the bar to the plate is shown as recessed into the plate, thus preventing turning of the bar relative to the plate but may be so constructed as to be adjustable relative to the plate about the axis of the stud if desired.

Having described my invention, I wish it to be understood that I do not wish to be limited to the exact details of construction shown and described for obvious modifications will occur to those skilled in the art.

I claim:

1. A trolley wire support for use on a curve in an overhead system comprising, a curved bar of metal having one edge adapted to guide a current collector, the bar being yieldable in the direction of its curvature whereby the radius of curvature may be changed to meet requirements, means at each end of the bar to hold the trolley wire in predetermined position relative to the bar, a strain plate positioned transversely of and attached to the bar adjacent its longitudinal center and projecting to opposite sides of the bar, the projecting portions having means to attach supporting means thereto and being depressed to bring the supporting means in substantial lateral alignment with said guide edge of the bar, tension rods extending from the end portions of the bar to the strain plate and means on the plate to attach the free end of the rods thereto to maintain the curvature of the bar, and other means on the plate to which the free ends of the rods may be attached in order to change the curvature of the bar and maintain such changed curvature.

2. A support for a continuous trolley wire on a curve in an overhead system comprising, a curved bar of metal adjustable to various radii of curvature as required and adapted to receive the trolley wire and maintain its curvature, means associated with the bar to hold the trolley wire in predetermined relation to the bar, a strain plate attached to the bar adjacent its longitudinal center and having arms projecting laterally in opposite directions therefrom, means associated with the plate to receive supports for the device, rods extending from points adjacent the ends of the bar to the strain plate and means on the bar at said points to which the rod ends are attached, means on the plate to cooperate with the free ends of the rods whereby the said ends are removably secured to the plate and other means associated with the plate arranged to cooperate with the free ends of the rods whereby the said ends of the rods may be attached to the plate at other points in order to change the curvature of the bar and to maintain such altered curvature the rod ends being so positioned relative to the bar as not to interfere with the trolley wire along the bar.

3. A trolley wire support for use on a curve in an overhead system to support a continuous trolley wire comprising, an elongated bar of metal curved to a predetermined radius, means at each end of the bar to hold adjacent portions of the trolley wire in predetermined relation to the bar, a strain plate attached to the bar adjacent its longitudinal center and projecting laterally from the convex side of the bar, tension rods associated with and extending from the bar on opposite sides of the plate to the strain plate, means on the strain plate cooperating with the tension rods to detachably secure the tension rods to the plate, the plate and bar and the rods forming a triangular shaped opening on each side of the plate, and means extending between and attached to two of the parts forming the said openings to prevent the entrance of a trolley head into said openings.

4. A trolley wire support for use on a curve in an overhead trolley system comprising, an elongated bendable bar of metal curved to a predetermined radius, means associated with the bar to hold a trolley wire in predetermined relation to the bar, laterally projecting means attached to the bar adjacent its longitudinal center, rods extending from the bar on opposite sides of the projecting means to the projecting means and attaching means associated with the projecting means to detachably secure the rods to the projecting means in different positions thereon whereby the curvature of the bar may be either increased or decreased without changing the length of the rods.

5. A device to support a pair of trolley wires on a curve in an overhead trolley system comprising, a pair of supports held in parallel and spaced relation, each support comprising an elongated curved bar of metal bendable in the direction of curvature, a transversely disposed plate attached to the bar intermediate its ends and projecting laterally to each side of the bar, means at each end of the plate to which attachments thereto may be made, tension rods extending from the bar on opposite sides of the plate to the plate and adjustably secured thereto whereby the curvature of the bars may be varied and maintained, insulating means attached to the first said means on the inner ends of the said plates of the two supports whereby the supports are held in spaced, parallel and insulated relation.

6. A strain plate for a trolley wire supporting device for use on curves and including an adjustable curved part having a guiding edge for a current collector comprising, a relatively thin elongated body of metal having a central portion and arms projecting oppositely from said central portion, the central portion being offset with respect to the plane of the arms and having means to receive supporting means on the said part of the device to be supported by the plate whereby the said part is secured to the plate with the said guiding edge substantially in the plane of the arms, means on one arm to receive supporting means for the plate and means on the other arm to receive the ends of tension rods extending to the aforesaid part whereby the connection of the tension rods to the plate may be varied and thereby the curvature of the said adjustable curved part changed.

7. A strain plate for an adjustable curved part adapted to support a trolley wire of an overhead curve comprising, an elongated body of metal having three portions, namely, an intermediate portion and two end portions projecting in opposite directions from the intermediate portion, the intermediate portion having means to cooperate with means on the said adjustable curved part to secure the two together, means on the arms to cooperate with supporting means for the plate, means on one arm to cooperate with means on one pair of ends of a pair of tension rods having the other ends connected to the said adjustable curved part and permit changing the point of connection of the rod ends to the plate whereby the curvature of the adjustable curved part may be changed to either increase or decrease the curvature of the said part without changing the length of the tension rods.

8. A hanger and pull-off device for a trolley wire on a curve in overhead construction comprising, an elongated curved bar having means to secure the trolley wire thereto in predetermined relation, a transversely disposed plate secured to the bar intermediate its ends and projecting laterally in opposite directions from the bar, means on each end of the plate to cooperate with supporting means for the plate, a tension rod extending from opposite sides of the plate and attached to the bar at opposite sides of the plate whereby the curvature of the bar may be adjusted, means on the plate to secure the free ends of the rods to the plate in adjustable relation thereto and means on each side of the plate to guard the device against a flying trolley head wedging between any of the above parts, the said guards each comprising a bar of metal attached to the plate and having an apertured end through which aperture the tension rod extends, each guard being so positioned as to obstruct the entrance of the trolley head into the space between the rod, bar and plate.

9. A hanger and pull-off device for a trolley wire on a curve in overhead construction comprising, an elongated curved bar with means to secure the trolley wire thereto in predetermined relation, a transversely disposed plate secured to the bar intermediate its ends and projecting laterally in opposite directions from the bar, means on each end of the plate to cooperate with supporting means for the plate, tension rods extending from opposite sides of the plate and attached to a point adjacent the ends of the bar whereby the curvature of the bar may be maintained against the stresses set up by the trolley wire, means on the plate to secure the free ends of the rods to the plate, the bar and the plate and the tension rods forming a triangular opening on each side of the plate, means on each side of the plate to guard the device against a flying trolley head wedging in the openings, the said guards each comprising a bar of metal extending between the tension rod and the plate and attached to the plate and tension rod in movable relation to each to prevent the entrance of the trolley head into the space between the bar, the rod and the plate.

10. In combination, a strain plate with means to receive supporting means therefor, a curved bar with means to attach the bar to the plate, a continuous trolley wire, means on the plate to engage the trolley wire and hold the wire in predetermined relation to the plate and to the bar, means at the ends of the bar to receive the wire and hold it in predetermined relation to the bar, a pair of tension rods, each rod having one end adjustably attached to the plate and the other end associated with the bar on opposite sides of the plate and spaced therefrom, the trolley wire projecting away from each end of the bar and substantially in alignment with the axis of the adjacent rod and means on the plate cooperating with the attached ends of the rods whereby the position of attachment of the rods to the plate may be varied, thereby changing the curvature of the bar.

11. A trolley wire support for curves in an overhead trolley system comprising, a curved bar of metal having means at each end of the bar to hold the trolley wire in position relative to the bar, a strain plate attached to the bar adjacent its longitudinal center, elongated attaching plates of metal secured to the bar along its convex side and spaced from the ends of the bar, the attaching plates preventing bending of the bar within the length of each attaching plate and each plate having a portion spaced laterally from the bar to provide a longitudinal channel, a tension rod for each attaching plate and each rod having one end secured to the attaching plate and the other end attached to the strain plate whereby the curvature of the bar is maintained against the stresses of the trolley wire, the end portions of the bar projecting longitudinally from the outer ends of the attaching plates and adapted to bend laterally under stress of the trolley wire whereby the said portions may automatically adjust themselves into alignment with the trolley wire and the tension rods.

12. A support for a trolley wire forming a part of a curve in an overhead system comprising an elongated bar of bendable material formed to a predetermined curvature, a transverse support member secured to the bar adjacent its longitudinal center, means whereby the curvature of the bar may be either increased or decreased, the said means comprising elongated members each having one end associated with the bar at points adjacent to but not at the ends of the bar and the other ends associated with the transversely disposed member at different positions thereon equally spaced from the bar at adjustable distances therefrom, and whereby the curvature of that portion of the bar subtended by the said elongated members after adjustment may be maintained against side pull of the trolley wire, those portions of the bar projecting from the subtended portion being adjustable into alignment with the trolley wire independent of the adjustability of the subtended portion and means associated with the bar to secure the trolley wire to the bar.

13. A device to support a trolley wire forming part of an overhead system comprising, an elongated bar of bendable metal formed to a predetermined radius of curvature, a transverse support member attached to the bar adjacent its longitudinal center, tension means extending from the bar on opposite sides of the support member to the support member and attaching means associated with the transverse member to detachably secure the tension means to the transverse member at different positions thereon at adjustable distances from the bar, whereby the radius of curvature of the bar may be either increased or decreased without altering the position of the curved bar on the transverse member and the curvature of the bar maintained against the side strain of the trolley wire after adjustment of the radius of curvature, and means associated with the bar to secure the trolley wire thereto.

14. A trolley support for use in a curve of an overhead trolley system comprising, an elongated bendable bar formed to a predetermined radius of curvature, means associated with the bar to hold a trolley wire, a supporting plate attached to the bar adjacent its longitudinal center, elongated means extending from the bar on opposite sides of the plate to the plate and means on the plate to receive the elongated means and adjustably secure the same to the plate at different points thereon whereby the radius of curvature of the bar may be changed from the said predetermined radius of curvature.

15. In combination, a strain plate with means to receive supporting means therefor, a curved bar with means thereon to attach the bar to the plate intermediate its ends, a continuous trolley wire positioned along the convex face of the bar and projecting away from each end of the bar in substantial alignment therewith, means associated with the bar to hold the trolley wire in position therewith, elongated means extending from the bar on opposite sides of the plate to the plate and attaching means associated with the plate to detachably secure the elongated means to the plate in different positions thereon whereby the curvature of the bar may be changed to conform to the desired curvature of the trolley wire.

16. A trolley conductor support comprising an elongated laterally curvable metal body member, means associated with the body member to position the trolley conductor in predetermined relation to said body member, laterally projecting means attached to the body member intermediate its ends, tension members secured at one end adjacent opposite ends of the body member and extending toward the projecting member, adjusting means extending longitudinally along the opposite sides of the laterally projecting means and spaced from the body member, means cooperating with the adjusting means and with the other ends of the tension members to secure the ends of the members to the laterally projecting means in adjustable relation thereto whereby the curvature of the body member may be varied.

17. A support for a trolley wire forming a part of a curve of an overhead system comprising in combination, a curved bar, means to secure the trolley wire to the bar, support means of fixed length secured to the bar intermediate the ends of the bar and strain means of fixed length acting in opposition to the stress set up by the trolley wire and extending from the bar on opposite side of the support means to the support means, the support means and the strain means being so constructed and related to each other that the curvature of the bar may be changed by changing the connected relation of the strain means to the support means.

18. A support for a trolley wire forming a part of an overhead system comprising in combination, a curved bar, means to secure the trolley wire to the bar, support means for the bar secured to the bar adjacent the longitudinal center thereof and strain means acting in opposition to the stress set up by the trolley wire and extending from the bar on opposite side of the support means to the support means and so constructed and related to the bar and support means that the curvature of the bar may be changed without changing the length of the strain means or altering the position of the bar on the support means, the support means and the bar and the strain means forming an opening on each side of the support means, and means extending between and attached to at least two of the last said parts forming said opening to prevent the entrance therein of a dewired trolley head.

19. A strain plate for a curved trolley wire support member comprising, an elongated body of metal, means on the plate intermediate the ends thereof to which the trolley wire support member may be secured, means on the plate to receive means by which the plate may be suspended and means extending along the plate adjacent to the opposite longitudinal edges thereof to receive the ends of tension means extending to the trolley wire support whereby the connection of the tension means to the plate may be varied relative to the trolley wire support member and thereby change the said curvature of the curved member.

20. A trolley wire support for use on a curve in an overhead system comprising, an elongated bendable bar of metal formed to a curve of predetermined radius, the said bar having a lower edge adapted to engage with and guide a current collector across the support, means associated with the bar to hold a trolley wire in predetermined relation to the said lower edge of the bar, a laterally projecting support member attached to the bar intermediate its ends, tension means extending from the bar on opposite sides of the projecting member to the projecting member and attaching means associated with the projecting member to detachably secure the tension means to the projecting member in different positions thereon whereby the radius of curvature of the bar may be increased or decreased.

21. In combination, a strain plate with means for attaching supports thereto, a curved bar of bendable material to guide a current collector, means securing the bar and the plate together at substantially the longitudinal center of the bar against relative longitudinal movement, a continuous trolley wire forming part of a curve in an overhead trolley system and extending from the ends of the bar to the plate and projecting away from the ends of the bar in substantial alignment therewith, means attaching the trolley wire to the ends of the bar, other attaching means associated with the plate and detachably securing the trolley wire to the plate in different positions thereon whereby the included angle formed by the trolley wire between the ends of the bar may be adjusted and held at a predetermined value and the projecting trolley wire in substantially longitudinal alignment with the ends of the bar.

22. In combination a strain plate with means to secure it to supporting means therefor, an elongated bar of bendable material formed to a predetermined curvature and having its lower longitudinal edge arranged to guide a current collector, means securing the bar to the plate against relative longitudinal movement, a continuous trolley wire forming part of a curve in an overhead trolley system extending from end to end of the bar and secured to the strain plate and forming an angle having a predetermined angular spread, means securing the trolley wire to the ends of the bar, other attaching means associated with the plate and movable longitudinally thereof adjustably securing the subtended portion of the trolley wire to the plate, the last said adjustable feature together with the bendable property of the bar permitting the adjustment of the trolley wire and the bar to bring the trolley wire and the ends of the bar into longitudinal alignment.

23. A device to support a trolley wire and form a part of an overhead trolley system comprising, an elongated bar of bendable metal formed to a predetermined curvature, a transverse support member secured to the bar adjacent its longitudinal center, elongated means associated with the bar at points on opposite end portions of the bar and spaced from the support member and also associated with the support member at points disposed along the support member and spaced from the bar at transversely adjustable distances therefrom whereby the curvature of the bar subtended by the said elongated means may be either increased or decreased and the adjusted curvature maintained against side strains in service and means associated with the bar to secure the trolley wire to the bar.

24. A support for a trolley wire forming a part of a curve of an overhead system, comprising, a curved yieldable bar of metal having a lower edge adapted to guide a current collector on a curve, means at each end of bar to receive and hold the trolley wire with the lower edge of those portions of the wire projecting longitudinally from the bar in alignment with the lower edge of the bar, an elongated strain plate positioned transversely to the bar and attached thereto at the upper edge of the bar, means associated with the plate to receive and hold the trolley wire intermediate its subtended length and other means to receive means for supporting the device, rods associated with the bar and plate and extending from a point adjacent the ends of the bar to the strain plate, a plurality of means associated with the plate and adapted to co-operate with the free ends of the rods whereby the radius of curvature of the bar may be either increased or decreased by changing the co-operation of the free ends of the rods with respect to the last said means.

SAMUEL S. MATTHES.